Sept. 15, 1964 S. W. MARTIN ETAL 3,148,816

TAPE TRANSPORTS

Filed May 14, 1962

INVENTORS.
STANLEY W. MARTIN
CHARLES H. PATTERSON

BY Christie Parker & Hale

ATTORNEYS.

United States Patent Office 3,148,816
Patented Sept. 15, 1964

3,148,816
TAPE TRANSPORTS

Stanley W. Martin, Tujunga, and Charles H. Patterson, Temple City, Calif., assignors to Consolidated Electrodynamics Corporation, Pasadena, Calif., a corporation of California Filed May 14, 1962, Ser. No. 194,442
5 Claims. (Cl. 226—95)

This invention is directed to improvements in magnetic tape transports, and more particularly, to an improved digital tape transport having rapid starting and stopping means and vacuum controlled buffering means between the storage areas and the operational zone.

In magnetic tape transports, the magnetic tape is generally stored on tape reels and fed between the reels through an operational zone. To read or write information on the tape, the tape is passed from a supply storage reel through a mechanical tensioning arrangement and under a magnetic read-write head to a take-up reel. To drive the magnetic tape from the supply reel to the take-up reel, tape transports generally include a pair of capstan drive arrangements, one located on either side of the magnetic head. One of the capstans is for driving the tape in a forward direction from the supply reel to the take-up reel while the other capstan is for reversing the tape to feed from the take-up reel to the supply reel. The capstans may be selectively engaged or disengaged with the tape to stop and start the tape as well as to start and then suddenly reverse the tape to read or write digital information on a particular portion of the tape.

The magnetic tape employed in tape transports is composed of a thin flexible material. Thus, in suddenly stopping and starting the tape care must be taken to insure that the tape is not damaged or broken. Since the reels cannot respond to these rapid changes in tape speed and direction, it is the practice to provide slack loops between the respective reels and the capstan drives. Tension is made in the slack loops by either mechanical spring-loaded idler arms and/or by elongated vacuum columns. Changes in the length of the slack loops are used to control the speed of the reel drives. In such tape transport arrangements, when the tape is suddenly started in one direction by the energizing of a capstan drive, the tape is withdrawn from one slack loop and added to the other slack loop. As the slack loops initially change length, they cause the reels to be brought up to full speed, restoring the slack loops to their proper length. Similarly, when the tape is suddenly stopped, the tape within the slack loops substantially absorbs the sudden tape strain until the tape reels can be stopped, thereby preventing the tape from being unnecessarily damaged or broken.

It has been found that even when slack loops are tensioned by the relatively low inertia vacuum columns the tape, instead of immediately coming up to full speed or immediately stopping in the operational zone, is subject to oscillations in velocity. The oscillations may have a dampening time of several milliseconds.

While the tape velocity is oscillating, information cannot be accurately read from or written on to the tape. Thus, the tape passing under the magnetic head during the dampening time represents lost tape. Since the time required in reading and writing information on the magnetic tape as well as the storage space on the tape is of a premium in high speed computer systems and the like, such losses are particularly undesired.

Furthermore, rapid starting and stopping of tape on a continuous basis in the operational zone, as is required in certain modes of operation of a digital recorder, may produce a resonant condition in the tape. Standing waves of increasing magnitude may be set in the tape which may cause the tape to break or may cause the tape loops to spill out of the vacuum columns.

In view of this the present invention provides extremely low inertia tape storage buffering adjacent to the pair of vacuum columns which effectively reduce the amplitude as well as the dampening time of the oscillations in tape velocity and hence the loss of magnetic tape storage space normally associated with the stop-start operation of tape transport units. In addition to the buffering, special shaping of the associated columns prevents standing waves in the tape.

Briefly, to accomplish this, the present invention in a basic form includes means defining a small pocket adjacent each of the columns. Each pocket includes means for drawing tape into the pocket and means for limiting the amount of tape within the pocket and the tension thereon.

More particularly, each pocket is located along the tape path between its associated vacuum column and a capstan drive for drawing tape from the column and under the magnetic head. Each pocket has an open face facing the tape and a width slightly greater than that of the tape in order that the pocket may receive tape passing from its associated vacuum column.

To draw tape within the pockets vacuum means extend to an inner surface of each of the pockets. The vacuum means reduce the air pressure in the pockets, thereby creating suction forces on the lower surface of the tape, causing the tape to be drawn, in the form of small loops, into the pockets against the normal tension of the tape.

To control the amount of tape drawn into each of the pockets, as well as to control the tensioning of the tape therein, venting means are employed in a side wall of each pocket along the tape path. The venting means at each pocket cooperates with the vacuum means such that as the tape is drawn into the pocket, increasing amounts of air from above the tape are allowed to pass to the vacuum means. The air passing to the vacuum means reduces the suction force on the lower surface of the tape loop as it descends into the pocket until the suction force equals the tension on the tape in the pocket. When this occurs an equilibrium point is defined beyond which the tape loop will not descend. In this manner the tape loop acts as a moving valve member increasing and decreasing the vacuum pressure below the tape as it moves up and down within the pocket, while the venting means, by controlling the suction force, limits the amount of tape drawn into the pocket and controls the tension on the tape while it is being drawn into and out of the pocket. In particular, the venting means is preferably arranged such that the maximum tape loop in each pocket has a length of less than one-tenth inch of slack.

In practice it has been found that with such an arrangement of the pockets, when a capstan drive is energized to draw tape out of a vacuum column, the tension on the tape in its associated pocket rapidly increases at a predetermined rate to a constant magnitude. The constant tension on the tape is many times smaller than the initial acceleration load normally exerted on the magnetic tape due to the initial driving force of the capstan and the inertia of the large mass of air in the vacuum column. The constant tension force is reflected to the tape in the vacuum column as the small tape loop is drawn from the pocket thus accelerating tape out of the vacuum column at a uniform rate.

In this manner, the pockets act as extremely low inertia tape storage areas for small tape loops and effectively isolate the tape in the vacuum columns associated therewith from the capstan drives by absorbing the initial acceleration and deceleration loads imposed on the magnetic tape by the large mass of air in the vacuum columns and the driving force of the capstan drives. The reduction in the acceleration and deceleration loads, in turn, effects a substantial reduction in the transient oscillations in tape velocity when a capstan drive is engaged. This, together with the uniform rate at which tape is drawn from the vacuum columns causes the tape to come up to a constant full speed in the operational zone in a minimum of time, thereby materially decreasing the amount of tape passing under the magnetic head between the time the capstan drive is energized and the time the tape is up to its full speed.

In addition, the vacuum columns themselves are tapered to provide a varying area in the tape loop as the loop moves along the column to prevent standing waves from developing in the tape.

The above, as well as other features of the present invention, may be more fully understood by reference to the following detailed description when considered with the drawings in which.

Figures 1, 2, 3:
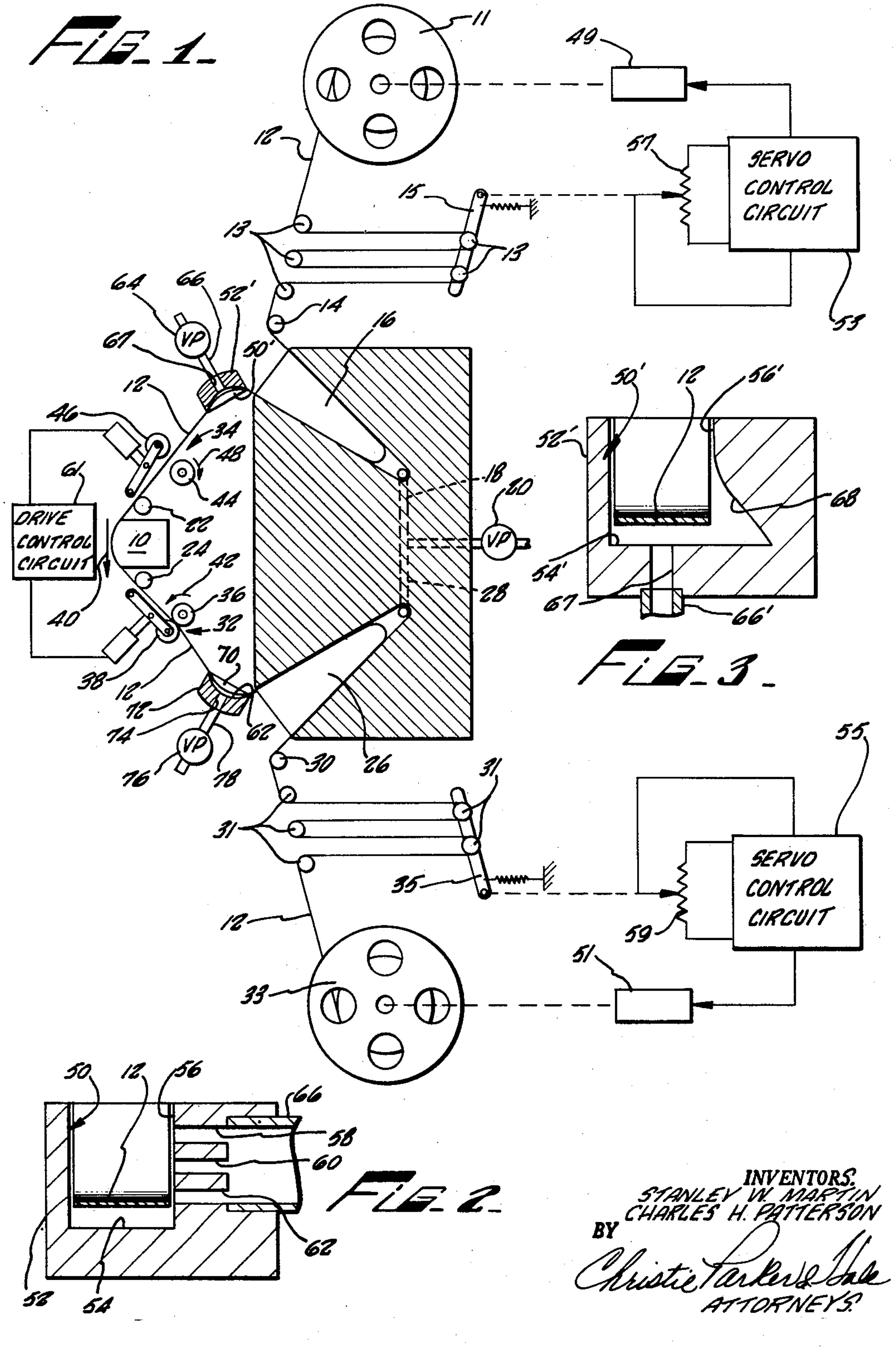
FIGURE 1 is a schematic representation of a tape transport unit employing the pocket apparatus and vacuum columns of the present invention.
FIGURE 2 is a cross-sectional representation of one form of the pocket assembly of the present invention.
FIGURE 3 is a cross-sectional representation of another form of the pocket assembly of the present invention.

The tape transport, a portion of which is schematically represented in FIGURE 1, includes a magnetic read-write head 10 for reading or writing information onto a tape 12 as it is directed under and in contact with the magnetic head 10.

Normally, the tape 12 is stored on a tape reel 11 in a storage area of the tape transport. The tape is fed from the reel through a series of fixed and movable guides 13, the movable guides being secured to a spring-loaded idler arm 15. The tape then passes over an idler roller 14 into a vacuum column 16. The vacuum column, as illustrated, takes the form of an enclosed V-shaped column. The apex of the V-shaped column is coupled by a tube member 18 to a vacuum pump 20. The vacuum pump 20 functions in a well known manner to create a partial vacuum within the column 16. The tape 12, in thus passing into the column 16, is acted upon by the partial vacuum to form a loop within the column as indicated.

The tape 12, in passing from the vacuum column 16 is directed over an idler roller 22 which is mounted to one side of the magnetic head 10. The tape passes from the idler roller 22 in contact with the magnetic head and over an idler roller 24. At the magnetic head information is either read from or written onto the tape by the magnetic head in response to circuitry (not shown) coupled to the magnetic head.

In passing from the idler roller 24, the tape 12 is directed to a vacuum column 26. Similar to the column 16, the vacuum column 26 may take the form of an enclosed V-shaped column having its apex connected by a tubular member 28 to the vacuum pump 20. The vacuum pump 20 functions to create a partial vacuum within the column 26. The tape 12, in passing into the column 26, is then acted upon by the vacuum to form a loop of tape within the column as indicated. The tape, in passing from the column 26, is directed over an idler roller 30 through a series of fixed and movable guides 31 to a take-up reel 33 in the tape transport storage area. The movable guides are carried on a spring-loaded idler arm 35 to form a tensioning arrangement.

To selectively drive the tape 12 between the supply reel and the take-up reel, as well as to impart selective stop-start and reversing movement to the tape 12, the magnetic tape transport includes a pair of capstan drive arrangements 32 and 34, respectively. The capstan drive 32 is located between the idler roller 24 and the vacuum column 26 and includes a drive roller 36 positioned on one side of the tape 12. Located on an opposite side of the tape 12 is a pinch roller 38. Normally the pinch roller 38 is spaced slightly from the tape 12 to allow free passage of the tape between the pinch roller 38 and the drive roller 36 to the vacuum column 26. When it is desired to drive the tape 12 through the capstan 32, the pinch roller 38 is energized in a conventional manner by a drive control circuit 61 to move toward and contact the tape 12, pinching the tape against the drive roller 36. Rotational movement of the drive roller 36, as indicated by the arrow 42, causes a counterclockwise rotation of the pinch roller 38 and imparts a forward driving movement to the tape 12, as indicated by the arrow 40. Such movement of the tape 12 causes the tape to feed from the supply reel through the vacuum column 16 past the magnetic head 10 and hence to the take-up reel.

The capstan drive arrangement 34 is located between the idler roller 22 and the vacuum column 16. Similar to the capstan 32, the capstan drive arrangement 34 includes a drive roller 44 located on one side of the tape 12 and a pinch roller 46 located on an opposite side of the tape. As indicated, the pinch roller 46 is normally spaced slightly from the tape 12 to allow the tape to freely pass to and from the vacuum column 16. However, when it is desired to impart movement to the tape 12 through capstan 34, the capstan drive 32 is de-energized and the pinch roller of the capstan drive 34 energized to move into contact with the tape 12, pinching the tape against the drive roller 44. Rotational movement of the drive roller 44, as indicated by the arrow 48, produces a clockwise rotation of the pinch roller 46 and imparts a reverse drive movement to the tape 12. Such movement causes the tape to pass from the take-up reel, through the vacuum column 26, past the magnetic head 10 and hence to the supply reel.

The reels are driven in conventional manner by reel motors 49 and 51. The torque of the reel motors is varied by servo control circuits 53 and 55 respectively in response to movement of the idler arms as sensed by potentiometers 57 and 59. The drive control circuit 61 operates the respective pinch rollers and controls the direction of the reel motors to provide for winding and rewinding of the tape.

In general, any capstan drive and control arrangement may be employed which provides means for selectively imparting driving movement to the pinch rollers 38 and 46 and for selectively actuating either one of the pinch rollers to contact the tape 12 to impart forward or reverse driving movement thereto.

As previously mentioned, the take-up and supply reels constitute a mechanical system having a high inertia. Thus, suddenly imparting movement to the magnetic tape by operation of one of the capstan drives produces a tensioning of the tape. Since the tape is lightweight and flexible, such tensioning may damage the tape or even cause the tape to break. In order to prevent tape damage as well as to provide apparatus for rapidly accelerating the tape to its full speed under a controlled tensioning, magnetic tape transports have provided vacuum columns such as 16 and 26 in FIGURE 1. The vacuum columns provide a relatively low inertia storage compartment for a loop of tape to effectively reduce the tension load on the tape as it is suddenly stopped and started through the selective actuation of the capstan drives 32 and 34. To provide such protection for the tape it has been found that the vacuum columns are necessarily of a relatively large volume and include a loop of tape of substantial length. When a capstan drive is suddenly actuated, the tape within the column is substantially free to move without large inertia to supply or take-up tape until the tape reels are able to come up to full speed in response to the motor drives connected thereto.

Although the addition of vacuum columns represents a substantial improvement in the overall operation of a tape transport unit, it has been found in practice that the vacuum columns introduce undesired oscillations in the velocity of the tape when it is suddenly subjected to a driving movement through the actuation of a capstan drive. Thus, instead of immediately coming up to full speed, the velocity of the tape tends to oscillate about the steady-state velocity for several milliseconds. During this time tape is rapidly passing under the magnetic head 10. Due to the variations in tape velocity, information cannot be accurately written or read from the tape. Thus, the quantity of tape passing the magnetic head during the period of time required to dampen out the oscillations in tape velocity represents lost tape. Also, the time required to dampen out the oscillations represents lost time to the overall system in which the tape transport is a component part.

To minimize the oscillations in tape velocity as well as the time required to bring the magnetic tape up to full speed the present invention, in a magnetic tape transport including vacuum columns, includes apparatus defining an extremely low inertia storage area located between the driving point of the tape and the vacuum columns for absorbing the initial acceleration and deceleration loads imposed on the tape by the vacuum columns and so isolate the vacuum columns from the capstan drive. This, it has been found, results in a substantial reduction in the oscillations in the tape velocity as well as in the time required for the tape to come up to a constant full speed.

In a preferred form, the low inertia storage area comprises apparatus defining a pocket 50 having its open surface immediately adjacent the vacuum column 16 to tangentially receive tape passing from the well in response to a forward driving movement of the capstan drive 32. The pocket 50, which is clearly illustrated in FIGURE 2, may be formed in block member 52 for mounting within the tape transport unit. The pocket 50 may have a curved inner surface 54 having a width slightly greater than that of the magnetic tape 12. It will be seen that the pocket walls form an opening of rectangular shape.

Extending through the block member 52 to the inner surface of a side wall 56 of the pocket 50 are a plurality of ports, 58, 60, and 62. Connecting the ports to a vacuum pump 64 is a tubular member 66. The vacuum pump 64 functions to create a partial vacuum within the pocket 50. The partial vacuum, in turn, develops a suction force on the lower surface of the tape 12 passing over the pocket 50 which draws the tape into the pocket to form a small tape loop. As the tape loop is drawn into the pocket 50 by the suction force, the ports 58, 60, and 62 are exposed in succession to air above the tape. The air passes through the ports, thus bypassing the tape 12, to the vacuum pump 64. Air passing through the port 54 reduces the partial vacuum and hence the suction forces acting through the ports 60 and 62. Air passing through the ports 58 and 60 further reduces the suction force acting through the port 62. When the suction force acting on the inner surface of the tape 12 equals the tension forces on the tape within the pocket 50, the tape loop ceases to be drawn into the pocket.

Preferably, the positioning of the ports and the vacuum pressure from the vacuum pump 64 is such that the difference between the maximum length of the tape loop within the pocket 50 and the cord length of the exposed surface of the pocket to the tape 12 is less than one-tenth of an inch.

Under such conditions it has been found, in practice, that when the capstan drive 32 is energized to draw tape from the vacuum column 16, tape is initially drawn out of the pocket 50. As the tape is drawn from the pocket 50 the tension on the tape in the pocket 50 rapidly increases toward some maximum magnitude at which the tape is pulled away entirely from the pocket. Before reaching this maximum tension, however, the tension in the tape reaches a level at which tape begins to be pulled out of the column 16. Because the acceleration of the tape in the large column 16 is lower than at the capstan, the tension continues to build up in the tape in the small pocket. Before the tension has built up greater than the maximum tension at which the tape pulls out of the small pocket, the tape being withdrawn from the large column has accelerated up to the full operating velocity. Thus the effect of the pocket is to permit the tape to accelerate up to full speed at the capstan in a shorter time than it accelerates up to full speed when the tape is withdrawn directly from the column. At the same time, the peak tension in the tape between the capstan and the column 16 is reduced, preventing undue stretching of the tape which otherwise would set up vibrations in the tape as it passes over the head. It should be noted that the effective time the pocket contributes to the acceleration time of the tape being pulled out of the column is a small fraction of a millisecond. In this manner the tape comes up to constant full speed at the magnetic head 10 in a minimum of time and with a substantial reduction being effected in the transient oscillations in tape velocity when the capstan drive 32 is engaged.

Another form of the pocket assembly of the present invention for effectuating a substantial reduction in the time required for the tape to come up to a constant full speed is illustrated in cross section in FIGURE 3. The embodiment represented in FIGURE 3 includes a body element 52′ for mounting in a tape transport. A body element 52′ includes a pocket 50′ preferably arranged to tangentially receive tape from the vacuum column 16. The pocket 50′ may have a curved inner surface 54′ having a width slightly greater than the width of the tape 12. Rather than including a plurality of ports to effectuate a controlled venting of air to the vacuum pump, a side wall 56′ of the pocket 50′ is shaped such that as the tape 12 descends into the pocket, air from above the tape passes around the edge of the tape adjacent the wall 56′ to a port 67. The port 67 extends through the body 52′ to the inner surface 54′ and is connected by a tubular member 66′ to the vacuum pump 64.

Preferably, to provide such venting, the side wall 56′ is tapered away from the tape 12, as indicated at 68. Thus, as the tape 12 is drawn into the pocket 50′ by the suction force acting through the port 67 on the inner surface of the tape, the tapered portion 68 is exposed to the air above the tape 12. As the tape is drawn into the pocket increasing amounts of air pass around the tape through the port 67 to the vacuum pump 64, thereby reducing the suction force on the tape 12. As described in connection with FIGURE 2, when the suction force acting on the inner surface of the tape substantially equals the tension forces acting on the tape within the pocket, the tape ceases to descend into the pocket. Preferably, the tapered portion 68 of the pocket 50′ is shaped such that the difference between the maximum length of the tape loop within the pocket 50′ and the cord length of the exposed surface of the pocket to the tape 12 is less than one-tenth of an inch.

Under such conditions, it has been found that the pocket 50′ functions similar to the pocket 50 to cause the tape to come up to constant full speed in a minimum of time with a substantial reduction in the transient oscillations in the tape velocity when the capstan drive 32 is engaged.

Similar to the pockets 50 and 50' described above, apparatus defining a pocket 70 is located immediately adjacent to the vacuum column 26. The pocket 70 which, by way of example, takes the form of the pocket 50 or the pocket 50' is formed from a block member 72. The pocket 70 is pressurably positioned to tangentially receive tape passing from the column 26 in response to driving movement imparted to the tape 12 by operation of the capstan drive arrangement 34. Passing through the block member 72 to the pocket 70 is an opening 74. Coupled into the opening 74 and connecting the pocket 70 with a vacuum pump 76 is a tubular member 78. The pump 76 functions to create a partial vacuum within the pocket 70 which thus operates in a manner described in connection with the pockets 50 and 50' to substantially reduce the time required to bring the tape 12 up to constant full speed in response to an energizing of the capstan drive 34.

Accordingly, by utilizing the pockets 50 or 50' and the pocket 70, when the capstan 32 is energized to impart a forward driving movement to the tape 12, the tape loop extending within the pocket 50 responds rapidly to momentarily absorb the initial tape tensioning as well as the initial acceleration of the tape 12. The tape within the vacuum column 16 is then subjected to a highly buffered acceleration and responds rapidly thereto to bring the tape 12 to its final velocity in an extremely short period of time and with a minimum of variations in the tape velocity. In practice it has been found that utilizing the vacuum pocket arrangement of the present invention in combination with a vacuum column, such as 16, reduces by a factor of at least three the time required to bring the tape 12 to its constant final velocity and reduces the magnitude of the oscillations in velocity about the final tape velocity by a factor of at least two.

In a similar manner, when the tape 12 is driven in a reverse direction by actuation of the capstan drive 34, the tape maintained within the pocket 70 effectively absorbs the initial tensioning and acceleration of the tape 12 to effect a buffering of the tape acceleration at the vacuum column 26. This materially reduces the time required to bring the tape 12 to its constant final velocity as described in connection with the pocket 50.

A similar function is performed by the pockets 50 and 70 when the tape is suddenly stopped by a de-energization of the capstan drives. In this case the pockets effectively absorb the initial deceleration of the tape to aid in bringing the tape to a sudden stop in a minimum of time without exerting undue stresses on the tape.

In this manner the pockets 50 and 70 effectively isolate the vacuum columns 16 and 26 from the points at which the tape is under a sudden maximum tension, that is, from the capstan drive arrangements 32 and 34, and reduces the time required to bring the magnetic tape to its constant final speed, thereby effectively reducing the amount of tape which is lost in the stop-start operation of the tape transport units.

In addition, the pocket apparatus of the present invention, by its positioning to tangentially receive tape from the vacuum columns 16 and 26, provides means for changing the direction of the tape with a minimum of friction. In particular, by utilizing the vacuum pockets 50 and 70, the magnetic tape 12, in passing from the columns 16 and 26, travels over a film of air within the pockets to be directed to the capstan drives 34 and 32, respectively. This effectively reduces the friction wearing on the magnetic tape normally produced by an idler roller which would be required to change the direction of the tape passing from the vacuum columns to the capstan drives.

In addition, by tapering the walls of the vacuum columns 16 and 26 it has been found that tape passing from the columns to the guides of the idler arms is stabilized against lateral oscillation that otherwise tends to occur when the tape is started and stopped at a high repetition rate. The tapered columns produce a variation in tape tension as a function of loop length which is different than in a column having parallel side walls. The tapering as shown has been found to provide significantly improved performance of the tape system.

What is claimed is:

1. In a tape transport including a magnetic head, a vacuum column, means for defining a loop of tape within the column, and drive means located adjacent the head for selectively drawing the tape along a tape path from the vacuum column past the head, the combination of means defining a pocket adjacent the column and located between the column and the drive means along the tape path, the pocket having a rectangular opening, guide means for directing the tape across the opening, the width of the tape being slightly less than the width of the opening, whereby the tape may be deflected into the opening, means including a passage communicating with the pocket for withdrawing air from within the pocket, and venting means in a side wall of the pocket along the tape path for allowing increasing amounts of air from above the tape to be directed to the passage as the tape is drawn into the pocket to reduce the vacuum pressure on the pocket side of the tape, the venting means being positioned so that the venting action becomes effective when the tape is drawn into the pocket a distance substantially less than the length of the rectangular opening, whereby the tape is drawn into a shallow loop.

2. Apparatus as defined in claim 1 wherein the venting means includes a plurality of openings in the side wall which are arranged at varying distances from the edge of the rectangular opening in the pocket.

3. Apparatus as defined in claim 1 wherein the venting means is formed by undercutting a portion of one side wall to provide increasing distance between portions of the side walls of the pocket to allow increasing amounts of air to leak around the margins of the tape as the tape is drawn into the pocket.

4. In a tape transport including a magnetic head, a vacuum column, means for defining a loop of tape within the column, and drive means located adjacent the head for selectively drawing the tape along a tape path from the vacuum column past the head, the combination of means defining a pocket adjacent the column and located between the column and the drive means along the tape path, the pocket having a rectangular opening, guide means for directing the tape across the opening, the width of the tape being slightly less than the width of the opening whereby the tape may be deflected into the opening, means including a passage communicating with the pocket for withdrawing air from within the pocket, and venting means in a side wall of the pocket along the tape path for allowing increasing amounts of air from above the tape to be directed to the passage as the tape is drawn into the pocket to reduce the vacuum pressure on the pocket side of the tape, the venting means being arranged to vent substantially all the air to the passage from the opening side of the tape when the length of tape drawn into the pocket is substantially less than the length of tape in the vacuum column.

5. In a tape transport including a magnetic head, a vacuum column, means for defining a loop of tape within the column, and drive means located adjacent the head for selectively drawing the tape along a tape path from the vacuum column past the head, the combination of means defining a pocket adjacent the column and located between the column and the drive means along the tape path, the pocket having a rectangular opening, guide means for directing the tape across the opening, the width of the tape being slightly less than the width of the opening whereby the tape may be deflected into the opening, means including a passage communicating with the pocket for withdrawing air from within the pocket, and venting means in a side wall of the pocket along the tape path for allowing increasing amounts of air from above the tape to be directed to the passage as the tape is drawn into the pocket to reduce the vacuum pressure on the pocket side of the tape, the venting means being positioned in the side wall such that substantially all the air is vented from above the tape when the excess tape drawn into the pocket exceeds one tenth of an inch.

References Cited in the file of this patent

UNITED STATES PATENTS

| | | |
|---|---|---|
| 2,778,634 | Gams et al. | Jan. 22, 1957 |
| 2,904,275 | Selsted et al. | Sept. 15, 1959 |
| 2,994,489 | Hare | Aug. 1, 1961 |
| 3,016,207 | Comstock | Jan. 9, 1962 |
| 3,074,661 | Brumbaugh et al. | Jan. 22, 1963 |

FOREIGN PATENTS

| | | |
|---|---|---|
| 1,163,105 | France | Apr. 21, 1958 |

OTHER REFERENCES

I.B.M. Technical Disclosure Bulletin, Aug. 2, 1959, vol. 2, page 8.